United States Patent
Wei et al.

(10) Patent No.: US 8,738,960 B2
(45) Date of Patent: May 27, 2014

(54) LOCAL PROTECTION METHOD OF ETHERNET TUNNEL AND SHARING NODE OF WORK SECTIONS OF PROTECTION DOMAIN

(75) Inventors: Yuehua Wei, Shenzhen (CN); Bin Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 247 days.

(21) Appl. No.: 13/386,413

(22) PCT Filed: Dec. 2, 2009

(86) PCT No.: PCT/CN2009/075271
§ 371 (c)(1),
(2), (4) Date: Jan. 21, 2012

(87) PCT Pub. No.: WO2011/011941
PCT Pub. Date: Feb. 3, 2011

(65) Prior Publication Data
US 2012/0297239 A1  Nov. 22, 2012

(30) Foreign Application Priority Data
Jul. 31, 2009  (CN) .......................... 2009 1 0090221

(51) Int. Cl.
*G06F 11/00*  (2006.01)

(52) U.S. Cl.
USPC ............................................. 714/4.1; 714/43

(58) Field of Classification Search
USPC ..................................................... 714/4.1, 43
See application file for complete search history.

(56) References Cited

U.S. PATENT DOCUMENTS

| 2004/0190444 A1* | 9/2004 | Trudel et al. ................... 370/224 |
| 2007/0086333 A1* | 4/2007 | Doukai et al. ................. 370/228 |
| 2008/0052394 A1* | 2/2008 | Bugenhagen et al. ........ 709/224 |
| 2008/0205263 A1  | 8/2008 | Cooley et al. |
| 2012/0147741 A1* | 6/2012 | Wei ............................... 370/225 |

FOREIGN PATENT DOCUMENTS

| CN | 101137974 A | 3/2008 |
| CN | 101227399 A | 7/2008 |
| GB | 2448711 A | 10/2008 |

OTHER PUBLICATIONS

International Search Report for PCT/CN2009/075271 dated Apr. 22, 2010.

* cited by examiner

*Primary Examiner* — Charles Ehne
(74) *Attorney, Agent, or Firm* — Ling Wu; Stephen Yang; Ling and Yang Intellectual Property

(57) ABSTRACT

The invention discloses a segment protection method for an Ethernet tunnel, there are two segment protection domains with a shared link in a Provider Backbone Bridge-Traffic Engineering (PBB-TE) network, and at least one of the two segment protection domains works in a non-revertive mode, and when a simultaneous failures of working segments of two segment protection domains recover or a failure of the shared node of the working segments recovers, the shared node of the working segments switches all the FDB entries of bidirectional ESPs of all the TESIs protected by the protection domains to standby entries, and after switching, out ports of the FDB entries of the ESPs are the ports connecting the shared segment. The invention also discloses a shared node of working segments of protection domains correspondingly. The invention is able to ensure that the bidirectional ESPs are co-routed after the failure recovering.

4 Claims, 5 Drawing Sheets

US 8,738,960 B2

LOCAL PROTECTION METHOD OF ETHERNET TUNNEL AND SHARING NODE OF WORK SECTIONS OF PROTECTION DOMAIN

TECHNICAL FIELD

The invention relates to the field of network communication technology, and in particular, to a segment protection method for an Ethernet tunnel and a shared node of two protection domains.

BACKGROUND OF THE RELATED ART

With the raise of the conception of Carrier Ethernet (CE), Provider Backbone Transport (PBT) technology, which is a connection oriented Ethernet technology meeting requirements of the telecommunication network, emerges in October, 2005. Thereafter, there are both domestic and foreign providers to network adopting the PBT technology, which has afforded a good beginning for the development of the PBT technology in the Metropolitan Area Network (MAN).

The foundation of PBT technology is the Provider Backbone Bridge (PBB) technology defined in the IEEE802.1ah standard, and is called as Provider Backbone Bridge Traffic Engineering (PBB-TE) by the IEEE. The core of the PBB-TE technology, which is based on the PBB technology, is to improve the PBB technology. The PBB-TE technology uses the Media Access Control (MAC) address of the outer layer in combination with the Virtual Local Area Network (VLAN) identifier of the outer layer, for example, a Backbone Destination MAC address (B-DA)+a Backbone VLAN Identifier (B-VID) to perform service forwarding with a preconfigured forwarding path. Network management and control make the services in the CE have connectivity in practice so as to implement the functions, such as protection switching, Quality of Service (QoS), and traffic engineering and so on, of the telecommunication network. PBB-TE technology is compatible with the architecture of conventional Ethernet bridges, and data frames can be forwarded based on B-DA+B-VID without updating intermediate nodes in the network or modifying the data frames, thus having a high forwarding efficiency.

The PBB-TE technology adopts a Connectivity Fault Management (CFM) mechanism in the IEEE802.1ag standard to continuously monitor the tunnel state in the network. When a working tunnel fails, a service will be automatically transferred to a pre-established protection tunnel, thus increasing necessary flexibility.

Attributes of the tunnel are represented by such a triad of <ESP-DA, ESP-SA, ESP-VID>, in which the parameter ESP-DA refers to the destination MAC address of Ethernet switched path, the parameter ESP-SA refers to the source MAC address of the Ethernet switched path, and the parameter ESP-VID refers to the value of B-VLAN. A point-to-point Traffic Engineering Service Instance (TESI) is composed of a pair of bidirectional point-to-point Ethernet switched paths. Specific description related to the triad and the TESI may see the IEEE802.1Qay standard.

FIG. 1 is a schematic diagram of the full path protection of the PBB-TE tunnel in the related art. The left-to-right direction in FIG. 1 is taken as example, and the ESP of the end-to-end working tunnel Y-B-C-D-X is <B-MAC2, B-MAC1, B-VLAN1>, wherein B-MAC2 is the MAC address of node X, which is the destination MAC address; B-MAC1 is the MAC address of node Y, which is the source MAC address; B-VLAN1 is the value of the B-VID of the end-to-end working tunnel Y-B-C-D-X.

The full path protection is implemented in FIG. 1, wherein Y and X are the ends of the tunnel instance of the end-to-end working tunnel Y-B-C-D-X of the TESI; Y-F-G-H-X is the protection tunnel of the Y-B-C-D-X. When it is detected that Y-B-C-D-X fails, it can be switched to the Y-F-G-H-X, and B-VLANs born on the tunnels are respectively designated for the working tunnel and the protection tunnel, for example, B-VLAN1 is designated to the working tunnel and B-VLAN2 is designated to the protection tunnel, when pre-configuring, for the purpose of distinguishing that a packet is forwarded on the working tunnel or the protection tunnel when forwarding the packet.

The continuity of a tunnel is checked by sending the Continuity Check Message (CCM) defined in the IEEE 802.1ag standard on the tunnel. Ends of the tunnel send CCMs to each other respectively along the working tunnel and the protection tunnel, and the CCM message headers for the working tunnel and the protection tunnel respectively encapsulates B-VLAN1 and B-VLAN2 (see the IEEE 802.1Qay standard).

Although the end-to-end protection technology of the PBB-IE can effectively protect tunnels, the end-to-end protection scheme not only has a relatively long protection switching time, but also involves relatively more nodes. Therefore, when a certain segment of a path is very fragile or a certain segment is very important, protection may be only made for a segment link of the end-to-end tunnel. The protection object of the segment protection domain is one or more protected TESIs born on the working segment in the segment protection domain. FIG. 2 is a schematic diagram of segment link protection of the PBB-TE in the related art. As shown in FIG. 2, B-C-D is the segment bearer link of the end-to-end working tunnels TESI-1 and TESI-2 and is the segment working link, and B-F-G-H-D is the segment protection link. To differentiate from the full path protection of the end-to-end tunnel, the segment link is called as the segment hereafter, i.e., B-C-D is a working segment, and B-F-G-H-D is the protection segment of the B-C-D. When the working segment has a failure, all the protected TESIs on the physical link are switched to the protection segment.

FIG. 3 is a schematic diagram of two segment protection domains with a shared link. As shown in FIG. 3, there are two segment protection domains, segment protection domain1 and segment protection domain 2. The working segment in segment protection domain 1 is the link of B-C, whose protection segment is B-F-G-C; the working segment in protection domain 2 is the link of C-D, whose protection segment is C-G-H-D. C-G is the shared link in the two segment protection domains, wherein C is the shared node in the working segments and the protection segments in the two segment protection domains (PIB for short), and G is the shared node only in the protection segments in the two segment protection domains (AIB for short). It is assumed that a certain TESI is carried on the working segments in the segment protection domain 1 and the segment protection domain 2 and is protected by the two protection domains, and the bidirectional ESPs of the TESI are ESP-1 and ESP-2. A filtering data base (FDB) is stored in the nodes and the FDB contains a plurality of FDB entries, whose normal form is <destination end (DA), ESP-VID>→out port (Out). In a normal case, ESP-1 of the TESI at the Y→X direction is along B-C-D in the protection domain. It is assumed that ESP-VID of ESP-1 is 1, then the FDB entry on the node of the protection domain is configured as the "<X, 1>→Out" entry in the filtering data base above the node in the figure. Similarly, it is assumed that ESP-VID of ESP-2 at the X→Y direction is 2, then the FDB entry on the node in the protection domain is configured as the "<Y, 2>→Out" entry in the filtering data base above the node in the figure.

In a normal case, segment protection domain 1 only needs to pre-configure working entry and standby entry for TESIs protected by the protection domain on the segment ends B and C, and switches between the two entries when a failure occurs. FIG .4 is a schematic diagram of the protection switching when the working link in one of the two segment protection domains with a shared link shown in FIG. 3 fails. As shown in FIG. 3 and FIG. 4, on ESP-1 at the Y→C direction, the working entry of node B is "<X, 1>→P2" and the standby entry is "<X, 1>→P3"; on ESP2 at the X→Y direction, the working entry of node C is "<Y, 2>→P1" and the standby entry is "<Y, 2>→P3". Nodes B and C forward packets according to working entries by default, and when the B-C link fails, nodes B and C switch to their own standby entries for filtering packets.

FIG. 5 is a schematic diagram of the protection switching when the shared node in the two segment protection domains with a shared link shown in FIG. 3 fails. As shown in FIG. 5, when the shared node PIB in the two segment protection domains with a shared link fails, the two segment protection domains switch the ESP-1 and ESP-2 from B-C-D to B-F-G-H-D, and at the moment, the configuration about the FDB entries of the bidirectional ESPs on the' node C (PIB) is unchanged, i.e., the configuration about using which FDB entry to filter packets is unchanged.

If both of the two segment protection domains adopt the non-revertive mode, then the traffic is still carried on the A-B-F-G-H-D-E link after the failure of node C (PIB) recovering. At the moment, the configuration about the FDB entries of the bidirectional ESPs on node C (PIB) is unchanged. FIG. 6 is a schematic diagram of the protection switching when the protection segment in protection domain 1 shown in FIG. 3 fails in the non-revertive mode. As shown in FIG. 6, at the moment, if the link F-G fails, the failure belongs to the failure of the un-shared link in the segment protection domain 1, then node B will switch the FDB entry of ESP-1 to the working entry "<X, 1>→P2", and node G (AIB) will switch the FDB entry of ESP-1 to "<Y, 2>→P3". In the node C (PIB), the FDB entry of ESP-1 is still maintained in the working entry "<X, 1>→P2", and the FDB entry of ESP-2 is still maintained in the working entry "<Y, 2>→P1", and therefore, ESP-1 is along with A-B-C-D-E and ESP-2 is along with A-B-C-G-H-D-E. It can be seen from the figure that ESP-1 and ESP-2 are now not co-routed at this moment, i.e., the bidirectional data streams of one data communication instance are not transmitted on the same path. Likewise, in the segment protection domains with a shared link, the case that bidirectional ESPs are not co-routed will also occur in the case that there is one segment protection domain working in the non-revertive mode. However, IEEE802.1Qay requires that the bidirectional ESPs of a point-to-point TESI should be co-routed, so for the existing segment protection method for Ethernet tunnels, when at least one of the two segment protection domains with a shared link works in the non-revertive mode, the bidirectional ESPs are not co-routed after the protection switching during the period from the working segments passing the two segment protection domains failing simultaneously or the shared node of the working segments failing to the failure recovering, which does not meet the requirement of IEEE802.1Qay.

SUMMARY OF THE INVENTION

In view of that, the main object of the invention is to provide a segment protection method for an Ethernet tunnel and a shared node of working segments in protection domains to meet the requirement in IEEE802.1Qay that the bidirectional ESPs of a point-to-point TESI should be co-routed, when simultaneous failures of working segments of the two segment protection domains recover or a failure of the shared node of the working segments recovers, thus improving the system stability.

To achieve the above object, the technical scheme of the invention is implemented as follows.

A segment protection method for an Ethernet tunnel, there are two segment protection domains with a shared link in a Provider Backbone Bridge-Traffic Engineering (PBB-TE) network, and at least one of the two segment protection domains works in a non-revertive mode, and a protection object of the segment protection domains is a Traffic Engineering Service Instance (TESI) carried on working segments of the protection domains; and the method comprises: when simultaneous failures of working segments of the two segment protection domains recover or a failure of the shared node of the working segments recovers, the shared node of the working segments of two segment domains switching all filtering data base (FDB) entries of bidirectional Ethernet Switched Paths (ESPs) of all the TESIs protected by the protection domains to standby entries, and after the switching, out ports of the FDB entries being a port connecting a shared segment.

Before the failure recovering, the method further comprising: the protected TESIs traversing along the working segments;

when the failure recovers, the two segment protection domains switching the TESIs to a protection segment and the protected TESIs traversing the protection segment.

A shared node of working segments of protection domains comprises: a failure detection unit, a filtering entry switching unit, and a filtering entry storage unit, wherein the failure detection unit is configured to: notify the filtering entry switching unit when detecting that simultaneous failures occurring on working segments of the two segment protection domains recover or a failure occurring on the shared node of the working segments recovers;

the filtering entry switching unit is configured to: switch all FDB entries of bidirectional ESPs of all of protected TESIs in the filtering entry storage unit from working entries to standby entries after receiving a notification from the failure detection unit, wherein after the switching, out ports of the FDB entries being a port connecting a shared segment;

the filtering entry storage unit is configured to: store FDB entries.

The shared node further comprises:

a packet filtering unit, which is configured to: filter a packet according to the FDB entries stored in the filtering entry storage unit.

The packet filtering unit is further configured to: traverse TESIs along the working segment before the failure occurring, and traverse TESIs along the protection segment when the failure occurs.

With the segment protection method for the Ethernet tunnel and the shared node of working segments in the protection domains disclosed in the invention, when there are segment protection domains with a shared link in a PBB-TE network, and at least one of the two segment protection domains of the shared link works is in a non-revertive mode, and simultaneous failures of working segments of the two segment protection domains recover or a failure of the shared node of the working segments recovers, the shared node of the working segments switches all the FDB entries of bidirectional ESPs of all the TESI protected by the protection domain to standby entries, i.e., after the switching, the out ports of the FDB entries of the ESPs are the ports connecting the shared segment. Since the shared node of the working segments switches the FDB entries of its bidirectional ESPs to standby entries after the failure recovering, therefore it is ensured that the bidirectional ESPs of the protected TESI are co-routed after the failure recovering, thus meeting the requirement in IEEE802.1Qay that the bidirectional ESPs of a point-to-point TESI should be co-routed, and improving the system stability.

PREFERRED EMBODIMENTS OF THE PRESENT INVENTION

The basic conception of the invention is that, when at least one of two segment protection domain of the shared link works in the non-revertive mode and simultaneous failures of working segments of the two segment protection domains recover or a failure of the shared node of the working segments recovers, the shared node of the working segments switches all the FDB entries of bidirectional ESPs of all the point-to-point TESIs protected by the protection domain to standby entries, i.e., after the switching, the out ports of the FDB entries are the ports connecting the shared segment.

The implementation of the technical scheme is further described in detail below with reference to drawings.

In the invention, the Ethernet tunnel comprises at least two segment protection domains with a shared link, and at least one of the two segment protection domains works in a non-revertive mode.

Figure 7:
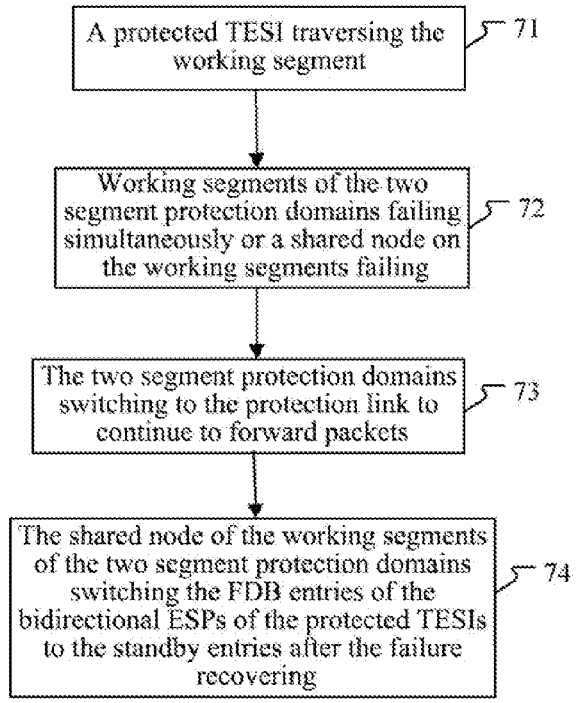
FIG. 7 is a flow chart of the segment protection method for an Ethernet tunnel according to the invention.

FIG. 7 is a flow chart of the segment protection method for an Ethernet tunnel according to the invention, and as shown in FIG. 7, the segment protection method for an Ethernet tunnel according to the invention generally comprises following steps.

Step 71, a protected TESI traverses the working segment.

Figure 1:
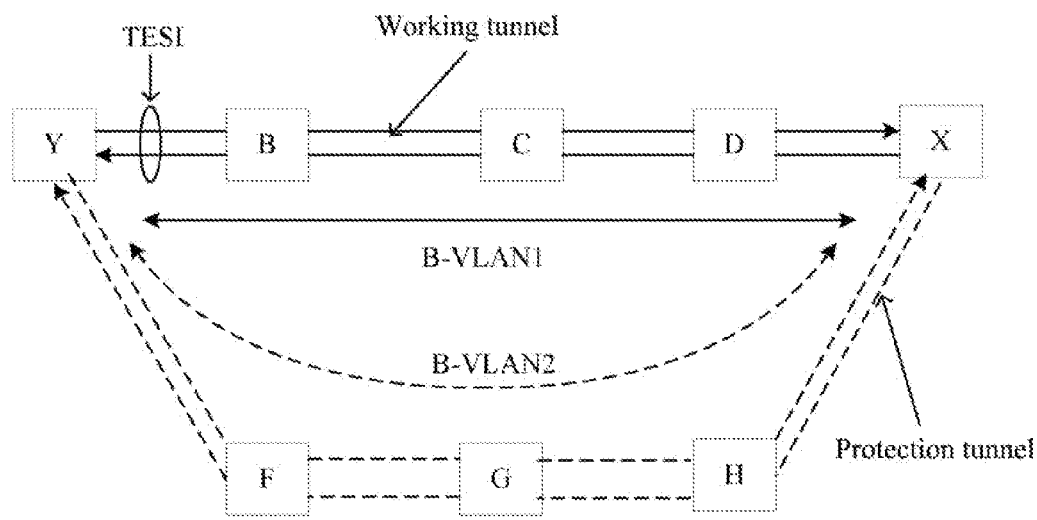
FIG. 1 is a schematic diagram of full path protection of the PBB-TE tunnel in the related art.
Figure 2:
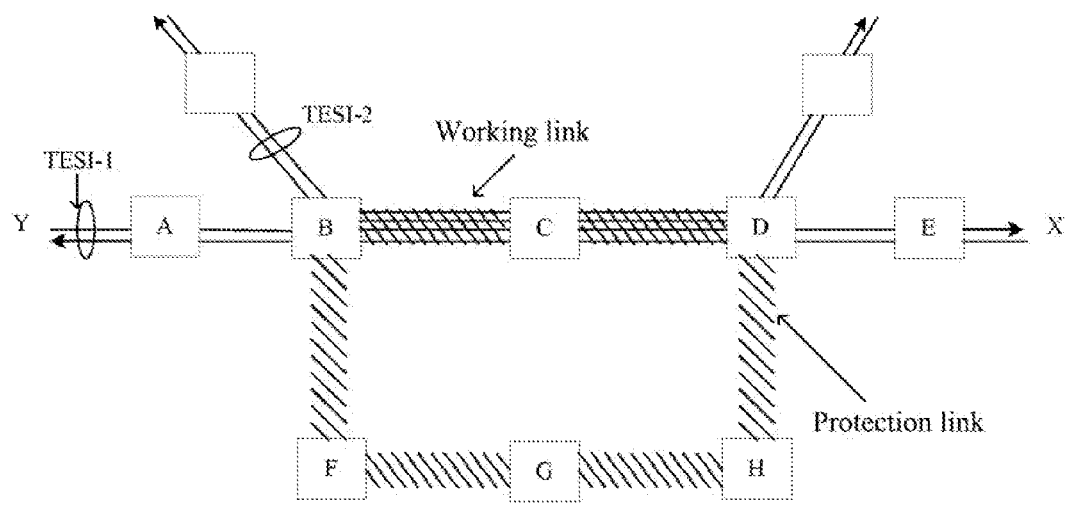
FIG. 2 is a schematic diagram of segment path protection of the PBB-TE in the related art.
Figure 3:
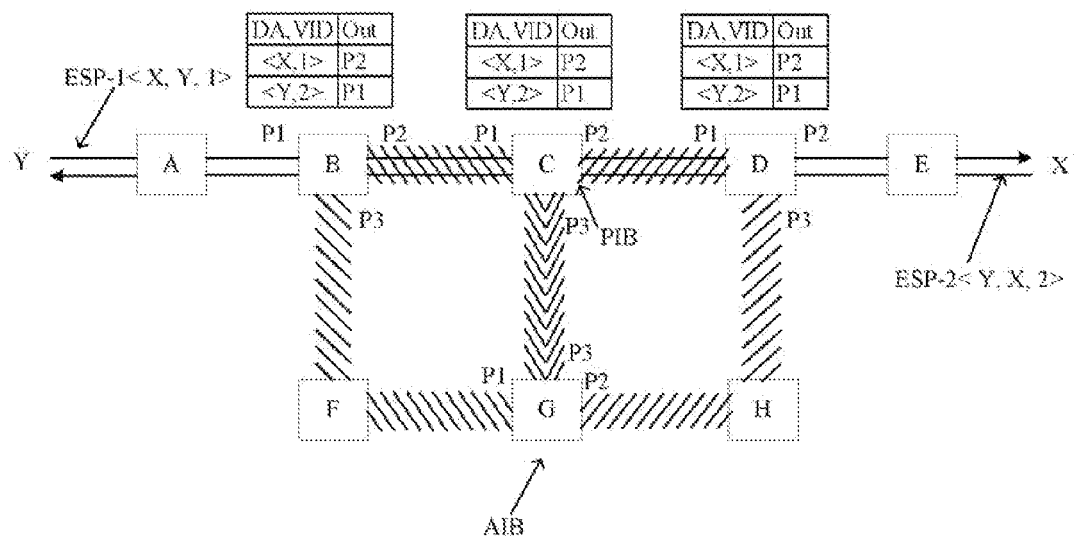
FIG. 3 is a schematic diagram of two segment protection domains with a shared link.
Figure 4:
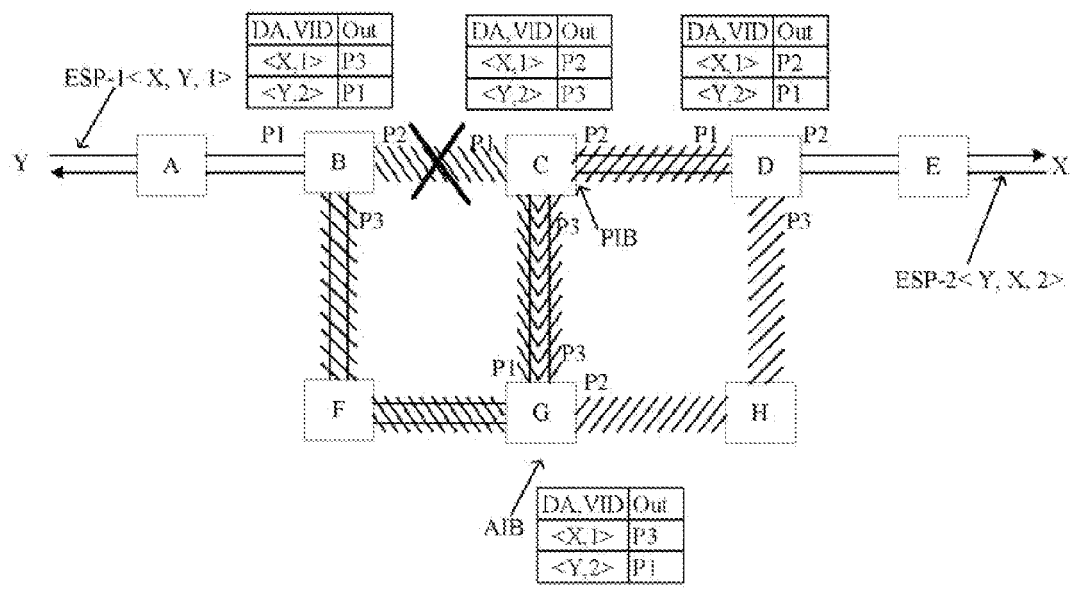
FIG. 4 is a schematic diagram of the protection switching when the working link in one of the two segment protection domains with a shared link shown in FIG. 3 fails.

When working links are normal, the protected TESI traverses the working segment. FIG. 3 is taken as an example, wherein the FDB entries of the bidirectional ESPs on node B are respectively working entries of <X, 1>→P2 and <Y, 2>→P1; the FDB entries of the bidirectional ESPs on node C are respectively working entries of <X, 1>→P2 and <Y, 2>→P1; the FDB entries of the bidirectional ESPs on node D are respectively working entries of <X, 1>→P2 and <Y, 2>→P1.

Step 72, working segments of the two segment protection domains have simultaneous failures or the shared node of the working segments has a failure.

Step 73, the two segment protection domains switch to the protection links to continue to forward packets.

Figure 5:
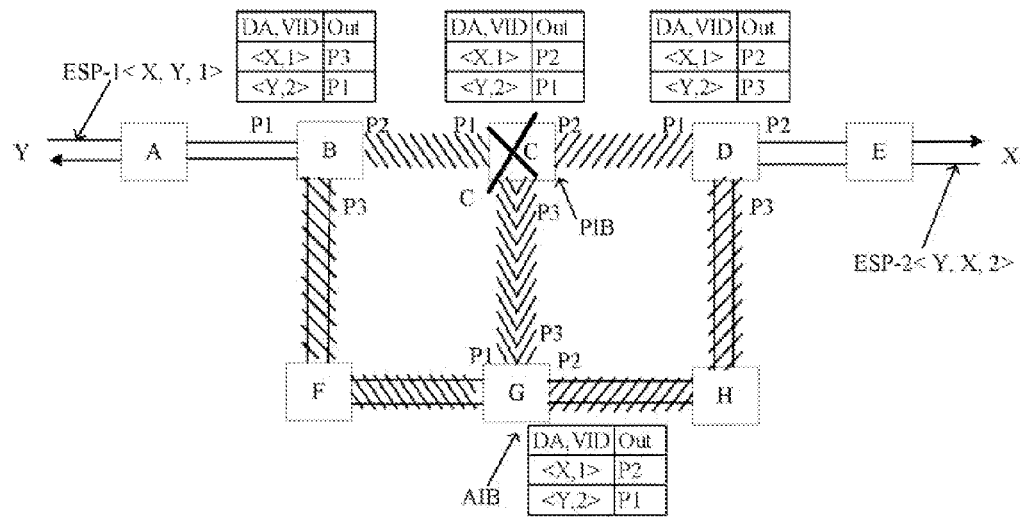
FIG. 5 is a schematic diagram of the protection switching when the shared node in the two segment protection domains with a shared link shown in FIG. 3 fails.
Figure 6:
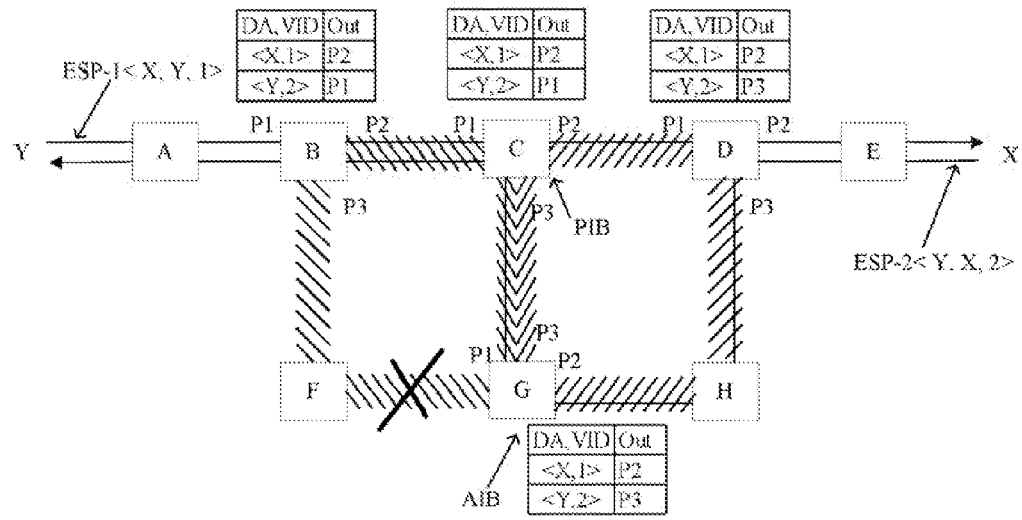
FIG. 6 is a schematic diagram of the protection switching when the protection segment in protection domain 1 shown in FIG. 3 fails in the non-revertive mode.

Herein, the simultaneous failures of working segments of the two segment protection domains or the failure of the shared node of the working segments will result in the two segment protection domains simultaneously switching to the protection links. The segment protection domain shown in FIG. 3 is taken as an example, wherein the path after the switching is as shown in FIG. 5, which is A-B-F-G-H-D-E, and the specific implementation of the switching is: the node B switching the FDB entry of ESP-1 from the working entry <X, 1>→P2 to the standby entry <X, 1>→P3 after detecting that working segments between B and C have failures or the node C has a failure, and the node D switching the FDB entry of ESP-1 from the working entry <Y, 2>→P1 to the standby entry <Y, 2>→P3 after detecting that working segments between C and D have failures or the node C has a failure. The FDB entries of the node G are <X, 1>→P2 and <Y, 2>→P1, and the FDB entries of node C are unchanged, which are still working entries <X, 1>→P2 and <Y, 2>→P1.

Step 74, the shared node of the working segments of the two segment protection domains switches the FDB entries of the bidirectional ESPs of the protected TESIs to standby entries after the failure recovering.

Figure 8:
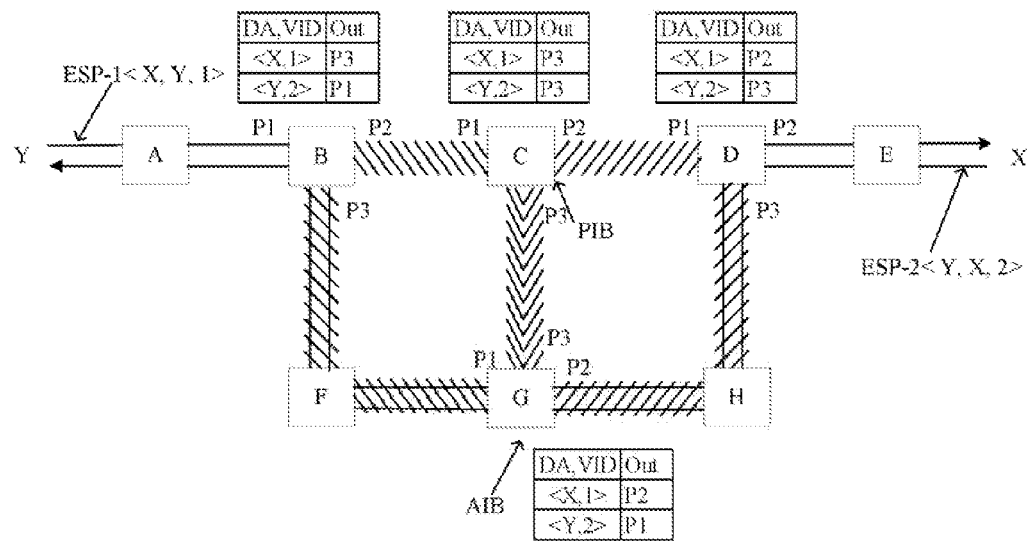
FIG. 8 is a schematic diagram of the configuration of FDB entries in node C after the failure recovering according to the invention.

The segment protection domain shown in FIG. 3 is taken as an example, wherein when the simultaneous failures of working segments of the two segment protection domains recovers or the failure of the shared node of the working segments recovers, node C switches the FDB entries of the bidirectional ESPs of the protected TESIs on this node from working entries of <X, 1>→P2 and <Y, 2>→P1 to the standby entries <X, 1>→P3 and <Y, 2>P1 at once, as shown in FIG. 8, i.e., the out ports of the bidirectional ESPs of the protected TESIs on node C are both port P3 on the shared link.

Figure 9:
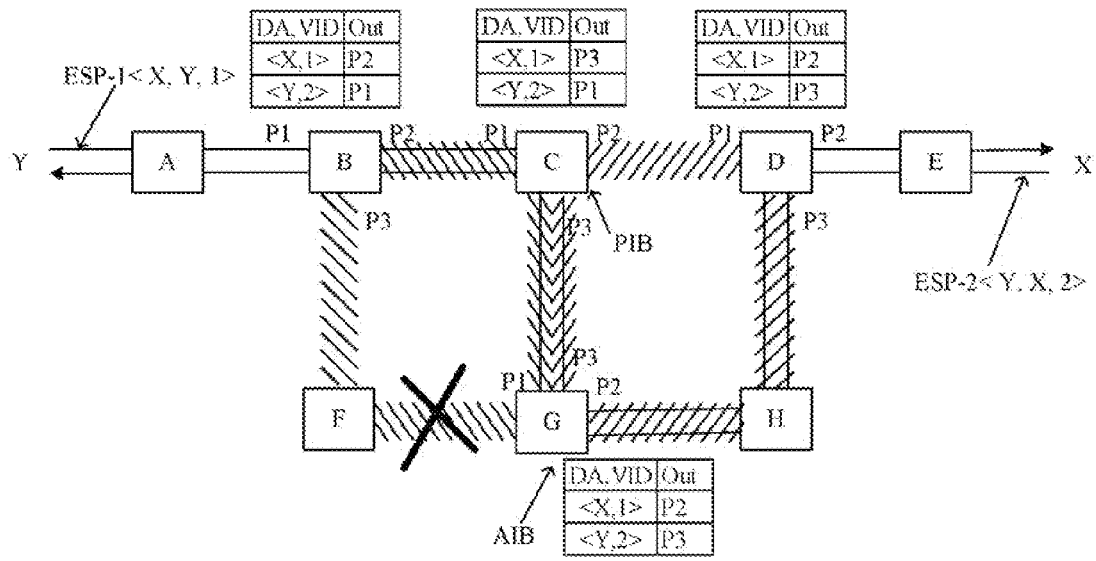
FIG. 9 is a schematic diagram of the protection switching when the protection segment in the segment protection domain 1 fails in a non-revertive mode.

FIG. 9 is a schematic diagram of the protection switching when the protection segment in the segment protection domain 1 has a failure in a non-revertive mode. As shown in FIG. 9, a certain TESI protected in the protection domain is taken as an example, wherein the bidirectional ESPs of the TESI are ESP-1 and ESP-2. When the protection link of the segment protection domain has a failure, the segment protection domain 1 will switch the bidirectional ESPs of the protected TESI back to B-C according to the normal protection switching procedure, of which the specific implementation is as follows: node B switching FDB entries thereon corresponding to ESP-1 from the standby entry <X, 1>→P3 back to the working entry <X, 1>→P2; correspondingly, node C switching FDB entries thereon corresponding to ESP-2 from the standby entry <Y, 2>→P3 back to the working entry <Y, 2>→P1. At the moment, because the FDB entry corresponding to ESP-1 on node C is set as <X, 1>→P3 in step 74, traffics of ESP-1 and ESP-1 are both carried on the A-B-C-G-H-D-E link, and thus the bidirectional ESPs is co-routed, which meets the requirement of the IEEE802.1Qay.

Likewise, when the segment protection domain 1 works in the non-revertive mode and segment protection domain 2 works in the revertive mode, the invention may also ensure that the bidirectional forwarding paths are co-routed.

Figure 10:
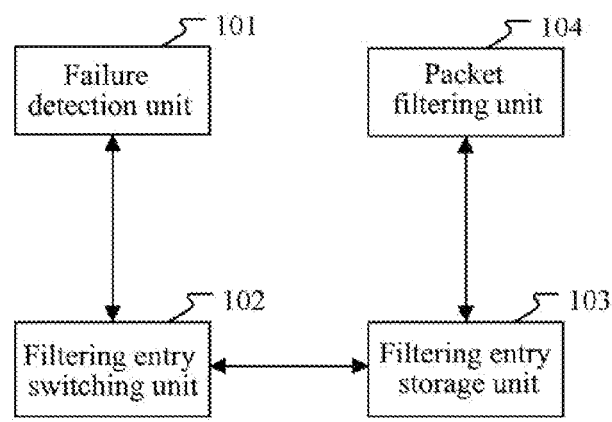
FIG. 10 is a structural diagram of the shared node of working segments in protection domains according to the invention.

FIG. 10 is a structural diagram of the shared node of working segments of protection domains according to the invention. As shown in FIG. 10, the shared node of working segments of protection domains according to the invention comprises: a failure detection unit 101, a filtering entry switching unit 102 and a filtering entry storage unit 103, wherein, the failure detection unit 101 is configured to: notify the filtering entry switching unit 102 after detecting that simultaneous failures of working segments of the two segment protection domains recover or a failure of the shared node of the working segments recovers;

the filtering entry switching unit 102 is configured to: switch FDB entries of bidirectional ESPs in the filtering entry storage unit 103 to standby entries after receiving the notification of the failure detection unit 101;

the filtering entry storage unit 103 is configured to: store FDB entries.

The shared node further comprises:

a packet filtering unit 104, which is configured to: filter packets according to the FDB entries stored in the filtering entry storage unit 103.

The packet filtering unit 104 is further configured to: traverse TESIs along the working segment before the failure recovering, and traverse TESIs along the protection segment when the failure recovering.

The above mentioned is just the preferred examples of the invention and is not intended to limit the protection scope of the invention.

What is claimed is:

1. A segment protection method for an Ethernet tunnel, comprising: in a Provider Backbone Bridge-Traffic Engineering (PBB-TE) network which comprises two segment protection domains with shared link and in which at least one of the two segment protection domains works in a non-revertive mode, when both working segments of the two segment protection domains have simultaneous failures or a shared node (PIB) on the shared link on the working segments of the two segment protection domains has a failure, at least one Traffic Engineering Service Instance (TESI) carried on the working segments of the two segment protection domains swithching to protection segments of the two segment protection domains;

when the simultaneous failures of the working segments of the two segment protection domains recover or the failure of the PIB recovers, the PIB switching all working entries in a filtering data base (FDB) thereon to corresponding standby entries, wherein, each working entry includes a destination MAC address, a VLAN ID of one of bidirectional Ethernet Swithced Paths (ESPs) of the said TESI and an out port directing to the working segment of the said one ESP, and the corresponding standby entry includes the same destination Mac address and VLAN ID with the working entry, and an out port directing to the protection segment;

thereby, when the protection segment of one of the two segment protection domains has a failure, and after the at least one TESI carried on the protection segment of the said one segment protection domain switch to the working segment of the said one segment protection domain, data streams on the bidirectional ESPs of the said TESI are transmitted on the same path.

2. A shared node segment protection apparatus for an Ethernet tunnel in a Provider Backbone Bridge-Traffic Engineering (PBB-TE) network which comprises two segment protection domains with a shared link and in which at least one of the two segment protection domains works in a non-revertive mode, the shared node (PIB) being on the shared link and on working segments of the two segment protection domains and comprising processor which comprises: a failure detection unit, a filtering entry switching unit, and a filtering entry storage unit, wherein the failure detection unit is configured to: notify the filtering entry switching unit when detecting that both the working segments of the two segment protection domains have simultaneous failures or the PIB has a failure;

the filtering entry switching unit is configured to: switch at least one Traffic Engineering Service Instance (TESI) carried on the working segments of the two segment protection domains to protection segments of the two segment protection domains;

the failure detection unit is further configured to: notify the filtering entry switching unit when detecting that the simultaneous failures of the working segments of the two segment protection domains recover or the failure of the PIB recovers;

the filtering entry switching unit is further configured to: switch all working entries in a filtering data base (FDB) in the filtering entry storage unit to corresponding standby entries after receiving a notification of recovering from the failure detection unit, wherein, each working entry includes a destination MAC address, a VLAN ID of one of bidirectional Ethernet Switched Paths (ESPs) of the said TESI and an out port directing to the working segment of the said one ESP, and the corresponding standby entry includes the same destination MAC address and VLAN ID with the working entry, and an out port directing to the protection segment;

the filtering entry storage unit is configured to: store the working entries and the standby entries in the FDB;

thereby, when the protection segment of one of the two segment protection domains has a failure, and after the at least one TESI carried on the protection segment of the said one segment protection domain switch to the working segment of the said one segment protection domain, data streams on the bidirectional ESPs of the said TESI are transmitted on the same path.

3. The shared node according to claim 2, wherein the processor further comprises:

a packet filtering unit, which is configured to: filter a packet according to the FDB entries stored in the filtering entry storage unit.

4. The shared node according to claim 3, wherein the packet filtering unit is further configured to: traverse the at least one TESI along the working segment before the failure occurring, and traverse the at least one TESI along the protection segment when the failure occurs.

* * * * *